(12) United States Patent
Simske et al.

(10) Patent No.: US 8,743,425 B2
(45) Date of Patent: Jun. 3, 2014

(54) METHOD FOR USING VOID PANTOGRAPHS

(75) Inventors: Steven J. Simske, Fort Collins, CO (US); Malgorzata M. Sturgill, Fort Collins, CO (US); Jason S. Aronoff, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 13/148,810

(22) PCT Filed: Feb. 26, 2009

(86) PCT No.: PCT/US2009/035358
§ 371 (c)(1),
(2), (4) Date: Aug. 10, 2011

(87) PCT Pub. No.: WO2010/098759
PCT Pub. Date: Sep. 2, 2010

(65) Prior Publication Data
US 2011/0310441 A1    Dec. 22, 2011

(51) Int. Cl.
| | |
|---|---|
| H04N 1/40 | (2006.01) |
| G06F 15/00 | (2006.01) |
| G06K 1/00 | (2006.01) |
| G06K 15/00 | (2006.01) |
| H04N 1/403 | (2006.01) |
| B42D 15/00 | (2006.01) |

(52) U.S. Cl.
USPC ......... 358/3.26; 358/2.99; 358/3.01; 358/1.6; 358/1.14; 358/1.18; 283/57; 283/58; 283/59; 283/72; 283/74; 382/100; 382/137; 382/162

(58) Field of Classification Search
USPC ............. 358/3.28, 1.6, 2.99, 3.01, 1.14, 1.18; 283/72, 74, 57, 58, 59; 382/100, 137, 382/162
See application file for complete search history.

(56) References Cited

U.S. PATENT DOCUMENTS

| | | |
|---|---|---|
| 5,575,508 A | 11/1996 | Diamond |
| 5,785,353 A | 7/1998 | Diamond |
| 5,878,604 A | 2/1999 | Phillips |
| 6,185,001 B1 | 2/2001 | Webendorfer et al. |
| 7,196,822 B2 * | 3/2007 | Hu .............................. 358/3.16 |
| 7,270,918 B2 | 9/2007 | Blood et al. |
| 7,376,264 B2 * | 5/2008 | Loce et al. ..................... 382/162 |
| 7,738,143 B2 * | 6/2010 | Ishimoto et al. .............. 358/3.28 |
| 7,742,181 B2 * | 6/2010 | Nakano ........................ 358/1.14 |
| 7,937,588 B2 * | 5/2011 | Picard et al. .................. 713/176 |

(Continued)

OTHER PUBLICATIONS

International Search Report and Written Opinion for PCT/US2009/035358 dated Oct. 26, 2009 (10 pages).

*Primary Examiner* — Barbara Reinier
*Assistant Examiner* — Jonathan Beckley

(57) ABSTRACT

A method for using void pantographs involves generating a test sheet including multiple void pantographs, where each of the multiple void pantographs includes a pantograph foreground and a pantograph background. The test sheet is printed, and from the printed test sheet, at least one of the multiple void pantographs having a covert or semi-covert pantograph foreground and background is identified. The printed test sheet is scanned, and from the scanned test sheet, at least one of the multiple void pantographs having an overt pantograph foreground is identified. A workflow is developed for the at least one of the multiple void pantographs having both i) the covert or semi-covert pantograph foreground and background after printing, and ii) the overt pantograph foreground after scanning.

15 Claims, 6 Drawing Sheets

(56) References Cited

U.S. PATENT DOCUMENTS

| | | | |
|---|---|---|---|
| 8,018,622 B2* | 9/2011 | Ono | 358/2.1 |
| 8,049,933 B2* | 11/2011 | Murakami | 358/3.23 |
| 8,150,034 B2* | 4/2012 | Hogl | 380/208 |
| 8,233,197 B2* | 7/2012 | Wang et al. | 358/3.28 |
| 8,355,180 B2* | 1/2013 | Wu et al. | 358/3.28 |
| 8,444,181 B2* | 5/2013 | Wicker et al. | 283/72 |
| 8,593,698 B2* | 11/2013 | Simske et al. | 358/3.28 |
| 2005/0142468 A1 | 6/2005 | Blood et al. | |
| 2006/0145469 A1 | 7/2006 | Lubrino et al. | |
| 2007/0246930 A1 | 10/2007 | Wicker | |
| 2007/0267864 A1 | 11/2007 | Fan | |
| 2008/0301767 A1 | 12/2008 | Picard et al. | |
| 2010/0014122 A1* | 1/2010 | Massicot et al. | 358/3.28 |

* cited by examiner

METHOD FOR USING VOID PANTOGRAPHS

BACKGROUND

The present disclosure relates generally to a method for using void pantographs.

Void pantographs are used to create copy-evident backgrounds for a variety of security documents. Some prominent examples of void pantographs are those that are used as backgrounds for checks, which, for example, display "VOID" or "COPY" on the reproduced image. Void pantographs may be used for packaging, labels, documents, or the like. In general, pantograph approaches may be used to hide in plain sight a variety of other information that can be read and acted upon.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The embodiments disclosed herein utilize a test sheet of test void pantographs to generate one or more workflows for the printed material incorporating one or more of such void pantographs. The workflow(s) are not necessarily known a priori, but instead is/are a function of how the one or more void pantographs appear after printing and scanning.

Figure 1:
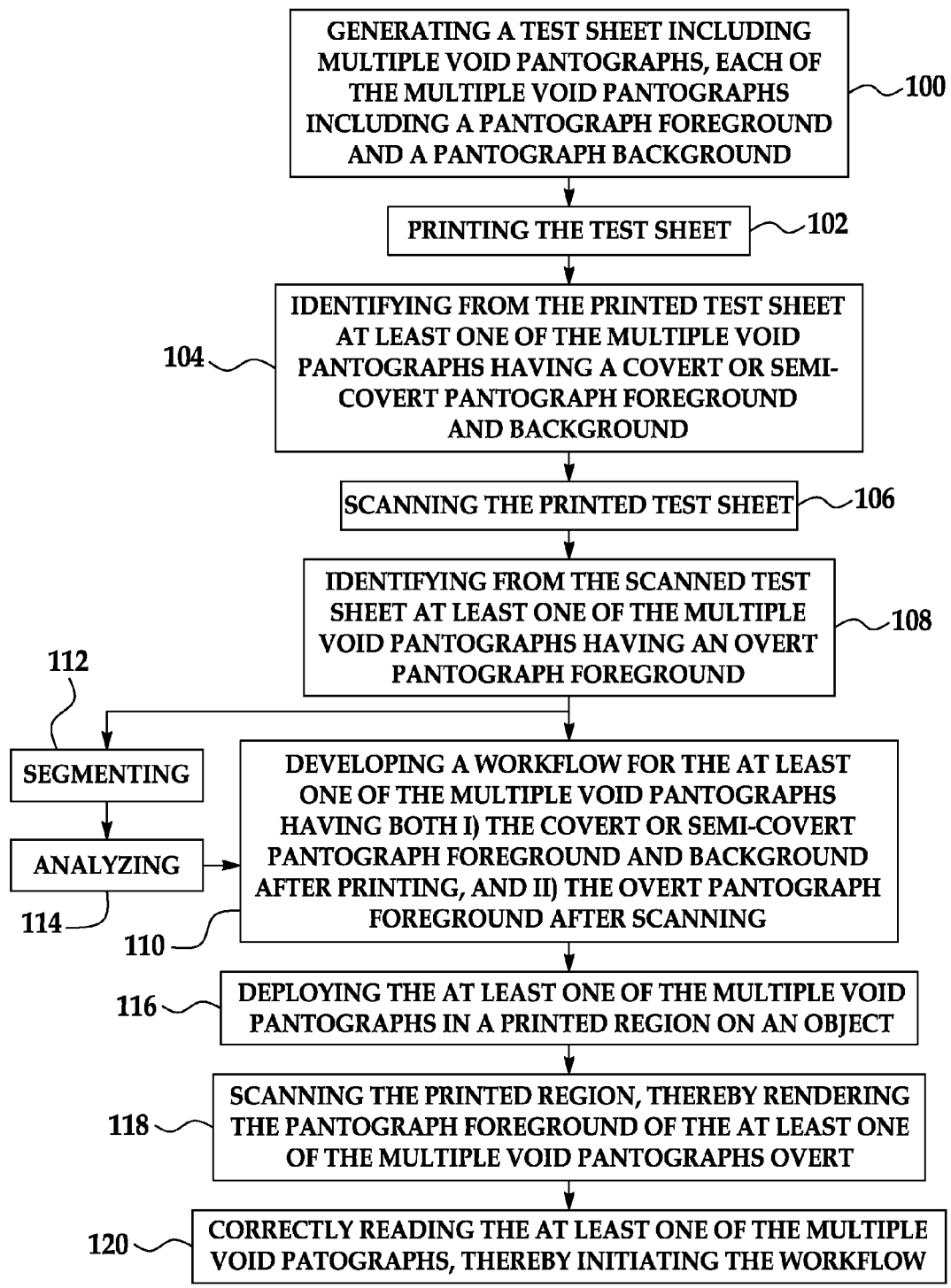
FIG. 1 is a flow diagram depicting an embodiment of a method using void pantographs.

An embodiment of a method disclosed herein is depicted as a flow diagram in FIG. 1. It is to be understood that each of the other Figures will be referenced throughout the description of the various steps of the method of FIG. 1.

Figure 2:
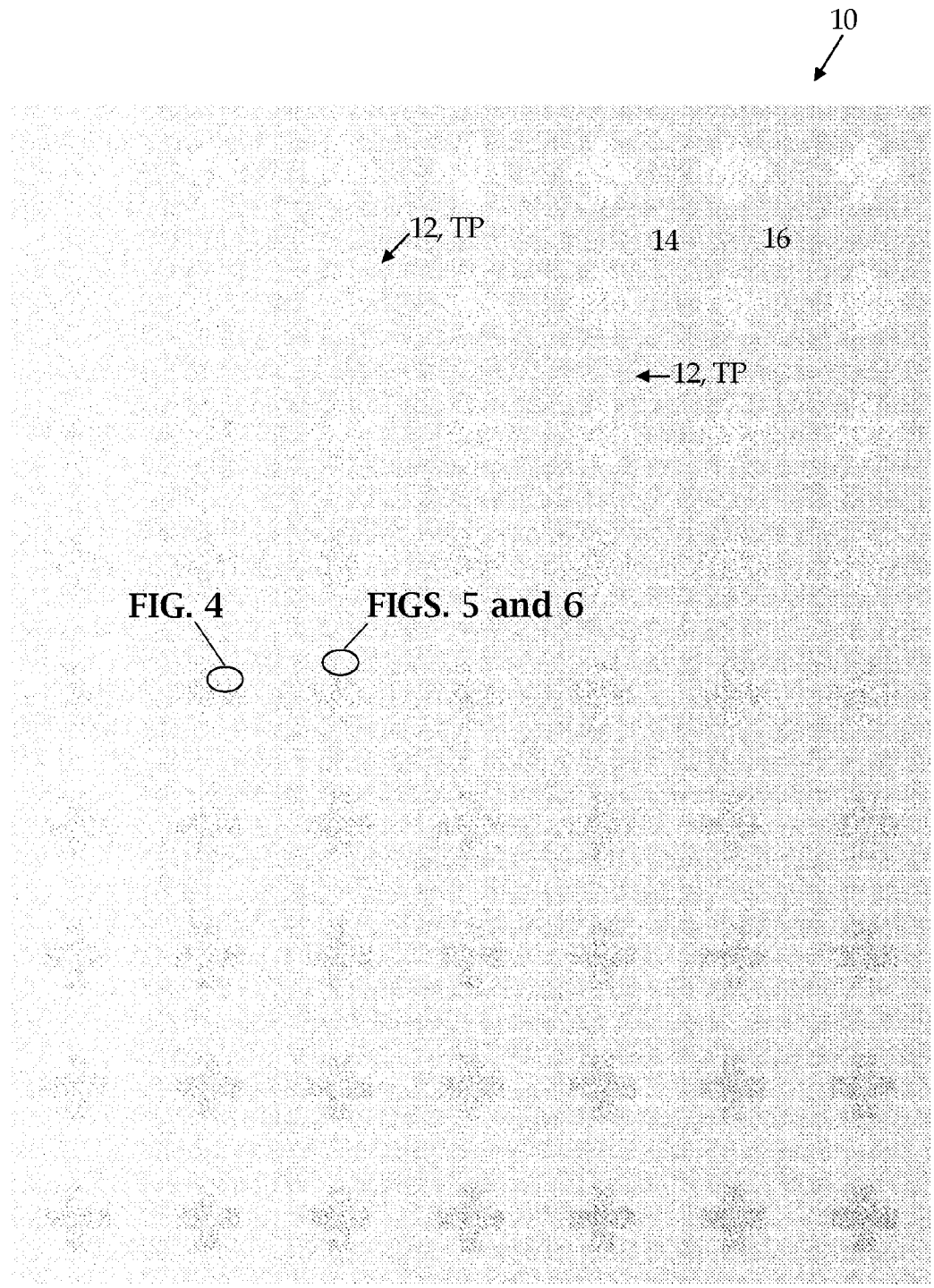
FIG. 2 depicts an embodiment of a computer-generated test sheet including multiple test pantographs.

As shown at reference numeral 100, the method includes generating a test sheet including multiple void pantographs. A non-limiting example of such a test sheet 10 is shown in FIG. 2. The test sheet 10 includes multiple void pantographs 12, each of which is generated from an image. It is to be understood that the void pantographs 12 on the test sheet 10 are test pantographs TP which are utilized to i) identify one or more pantographs 12 for subsequent deployment, and ii) generate a workflow for, or associated with the identified one or more pantographs 12.

Figure 3A:
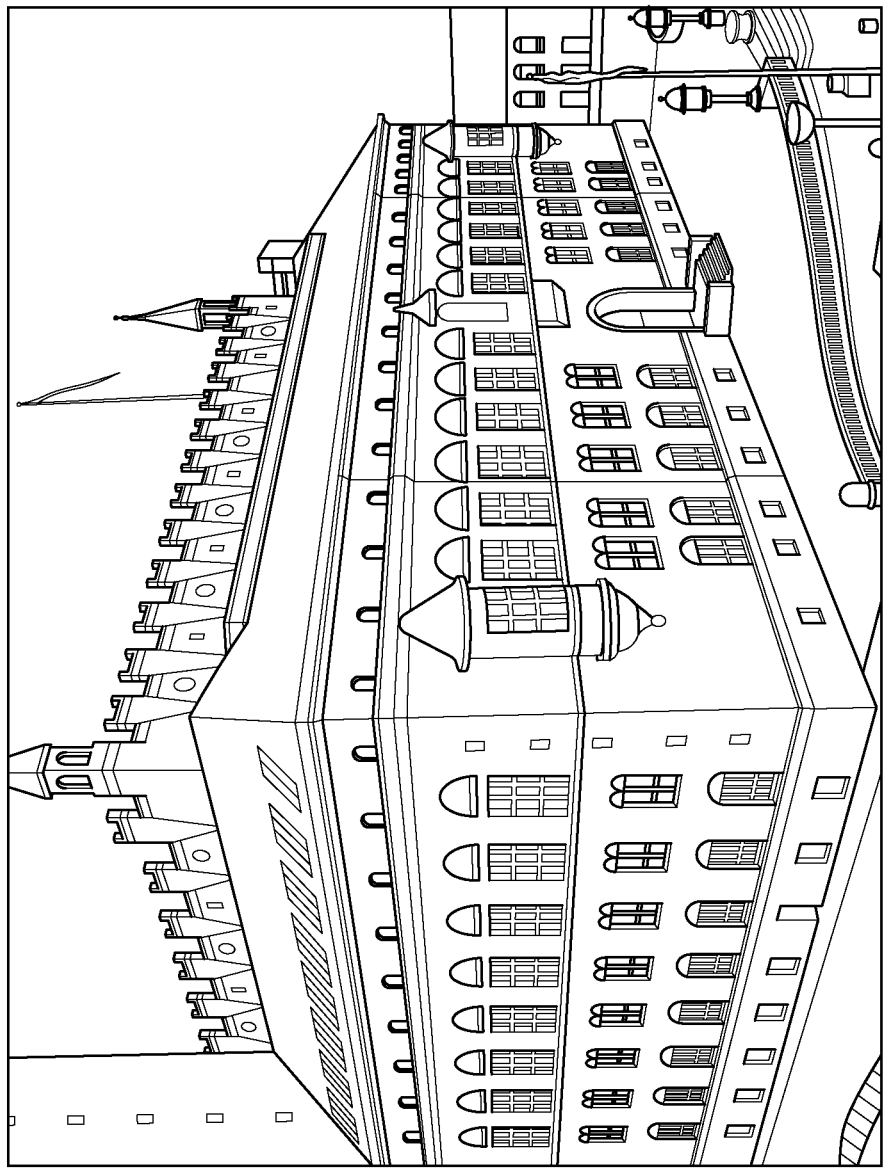
FIG. 3A is a schematic representation of an image.
Figure 3B:
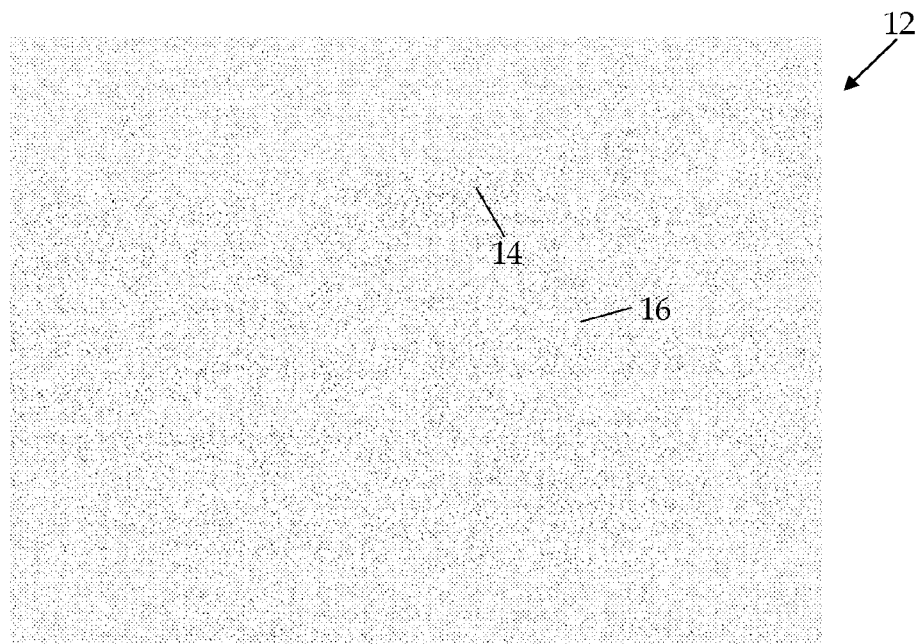
FIG. 3B depicts a void pantograph formed via the image of FIG. 3A after the void pantograph has been printed.
Figure 3C:
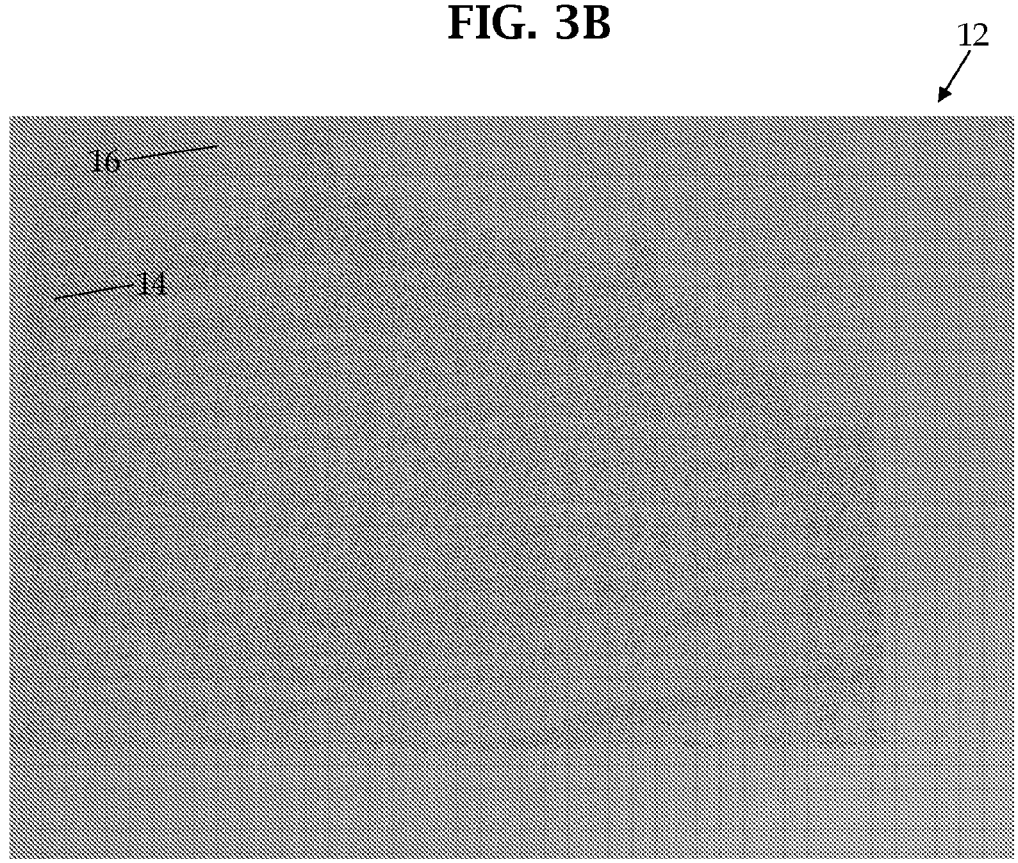
FIG. 3C depicts the void pantograph of FIG. 3B after the void pantograph has been scanned.

The step of generating one void pantograph 12 is schematically depicted in FIGS. 3A through 3C. The void pantograph 12 is generated from an image 18, a schematic non-limiting example of which is shown in FIG. 3A. The image 18 may be any digitized image, including an image captured with a digital camera, camcorder, or scanner. The image 18 may also be produced by imaging software, graphics software, or the like. The image 18 may be any desirable image, and in some instances, may incorporate text, shapes, glyphs, embedded information to initiate, instantiate, continue, complete, etc. workflow(s), security applications, or other information that can be read and interpreted.

The image 18 is filtered using one or more filters. Non-limiting examples of such filters include an edge filter (e.g., Sobel, Canny, Laplace, neighborhood variance, gradient, etc.), a color filter, a hue filter, a chroma filter, a saturation filter, a brightness filter, an intensity filter, a luminance filter, a texture filter, a local entropy filter, a graininess filter, a specific shape filter, a threshold (Otsu, etc.) filter, a sharpness filter, a convolution filter, or other imaging filters. It is to be understood that one of the filters may be selected to filter the image 18, or multiple filters may be selected to filter the image 18. The filter(s) designate one or more areas for a pantograph foreground 14 (see FIG. 3C) and a pantograph background 16 (see FIG. 3C) based upon the particular attribute associated with the filter. For example, if an edge filter is selected to filter the image 18, the filtering process will identify edge pixels and non-edge pixels. The filtered pixels are then assigned to the pantograph foreground 14 or background 16, depending, at least in part, on which pixels are suitable for forming the respective regions of the pantograph 12. Such foreground and background pixels may be selected automatically or by printing samples of both and selecting based on the printed samples. In an embodiment, the higher information areas (e.g., higher edge content or image entropy or image high frequency content) are separated from the lower information areas to make a good void pantograph image. In the example involving the edge filter, the edge pixels may be assigned to the pantograph foreground 14, and the non-edge pixels may be assigned to the pantograph background 16.

As used herein, the phrase "pantograph foreground" refers to the portion of the pantograph 12 that is covert or semi-covert after being printed on an object (see FIG. 3B), but that becomes patent or overt after the printed region of the object is scanned (see FIG. 3C). In other words, the pantograph foreground 14 may be visible to the human eye (e.g., upon close inspection) after printing (FIG. 3B), but is virtually indistinguishable from both the pantograph background 16 and the object foreground (not shown) after printing. As shown in FIG. 3B, the foreground 14 and background 16 seem to blend together such that they are not obviously distinguishable from each other. Also as used herein, the phrase "pantograph background" refers to the portion of the pantograph 12 that is covert or semi-covert after being printed on an object (see FIG. 3B), and remains visually the same after the printed region of the object is scanned (see FIG. 3C).

Once the areas of the image 18 are identified as being suitable for the pantograph foreground 14 or pantograph background 16, the characteristics of the foreground 14 and/or the background 16 may be manipulated, altered, etc. in order to generate the test sheet 10. Examples of such characteristics include the dot size, dot shape, dot orientation, dot color, a dot distribution method, a dot spacing pattern, etc.

As shown in FIG. 2, multiple test pantographs 12, TP may be employed in a single test sheet 10 for testing a plurality of pantograph foreground 14 and background 16 pairings. Table 1 below illustrates the various foreground 14 and background 16 pairings for the test sheet 10 of FIG. 2, which includes sixty three test pantographs 12, TP. In this example, the black pixel percent coverage is shown for each pairing, where the first number is the foreground percentage and the second number is the background percentage. As shown, multiple foreground pixel percent coverage values are tested with varying background pixel percent coverage values. The size of the test sheet 10 shown in FIG. 2 is one example, but it is to be understood that the pairings shown in Table 1 correspond to a test sheet 10 where each region including a test void pantograph 12, TP is 1"×1", resulting in a single A4/letter sized test sheet 10.

TABLE 1

Example Foreground and Background Pairings
for Test Pantographs in a Test Sheet

| | | | | | | |
|---|---|---|---|---|---|---|
| (.04, .016) | (.06, .024) | (.08, .032) | (.10, .04) | (.12, .048) | (.14, .056) | (.16, .064) |
| (.04, .022) | (.06, .033) | (.08, .044) | (.10, .055) | (.12, .066) | (.14, .077) | (.16, .088) |
| (.04, .028) | (.06, .042) | (.08, .056) | (.10, .07) | (.12, .084) | (.14, .098) | (.16, .112) |
| (.04, .034) | (.06, .051) | (.08, .068) | (.10, .085) | (.12, .102) | (.14, .119) | (.16, .136) |
| (.04, .04) | (.06, .06) | (.08, .08) | (.10, .10) | (.12, .12) | (.14, .14) | (.16, .16) |
| (.04, .046) | (.06, .069) | (.08, .092) | (.10, .115) | (.12, .138) | (.14, .161) | (.16, .184) |
| (.04, .052) | (.06, .078) | (.08, .104) | (.10, .13) | (.12, .156) | (.14, .182) | (.16, .208) |
| (.04, .058) | (.06, .087) | (.08, .116) | (.10, .145) | (.12, .174) | (.14,) .203 | (.16, .232) |
| (.04, .064) | (.06, .096) | (.08, .128) | (.10, .16) | (.12, .192) | (.14, .224) | (.16, .256) |

It is to be understood that in generating the test sheet 10, any desirable characteristics may be selected to remain static while other characteristics are varied. For example, in the test sheet 10 of FIG. 2, various foregrounds 14 are tested (e.g., 0.04, 0.06, 0.08, etc.) against various backgrounds 16. In this particular test sheet 10, each of the foreground pixel percent coverage values remains static in nine of the test pantographs 12, TP so that nine different background pixel percent coverage values may be tested against the respective foreground 14.

In another embodiment, desirable pantograph background 16 settings may be selected and then set. Once the desirable background 16 settings are determined, the foreground 14 characteristics may be readily altered to generate the test sheet 10.

In either of the previously described instances, maintaining static characteristics for one of the pantograph foreground or background 14, 16 enables the other of the pantograph background 16 or foreground 14 characteristics to be readily tested. As briefly mentioned above, the test pantographs TP are used to experiment with different characteristics in order to determine the best characteristics for deployment of the actual void pantograph 12.

Figure 4:
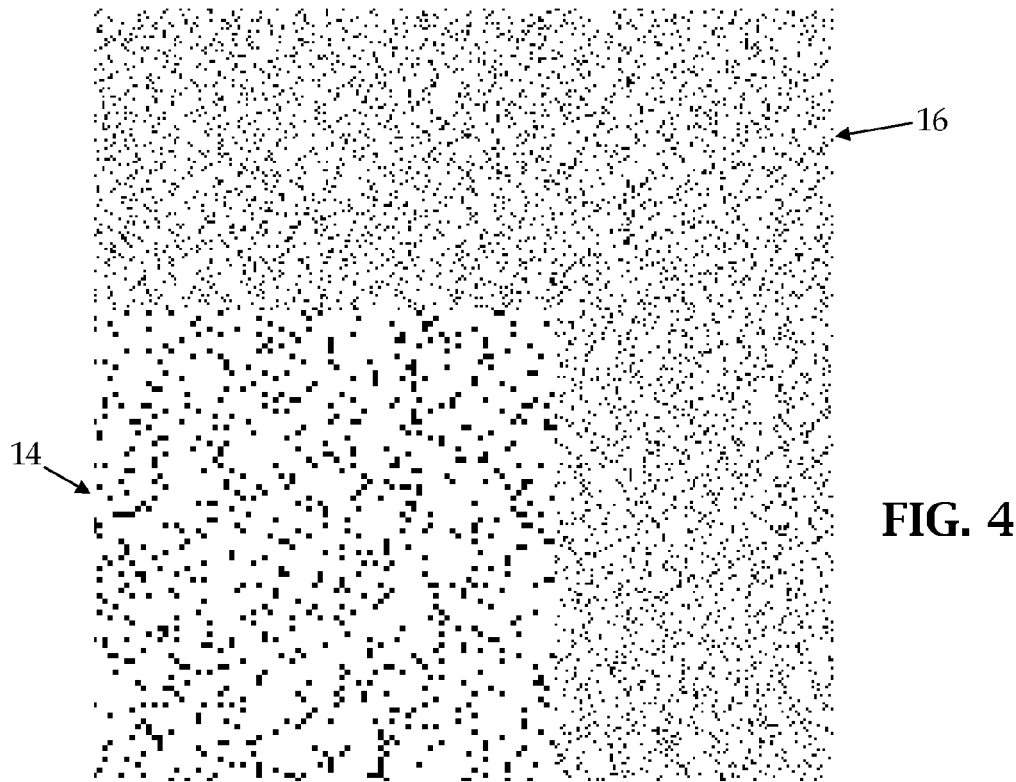
FIG. 4 is an enlarged view of a portion of one of the test void pantographs of the test sheet of FIG. 2, where, in this example representation, the test void pantograph is generated with different dot sizes at the same black pixel density.
Figure 5:
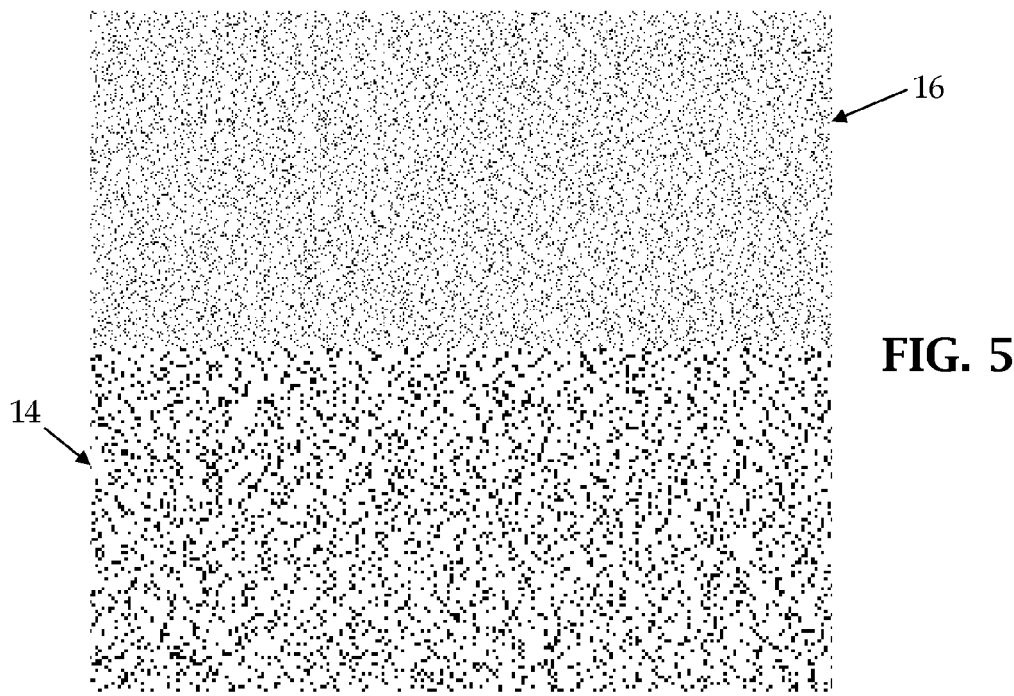
FIG. 5 is an enlarged view of a portion of one of the test void pantographs of the test sheet of FIG. 2, where, in this example representation, the test void pantograph is generated with different dot sizes and different black pixel densities.
Figure 6:
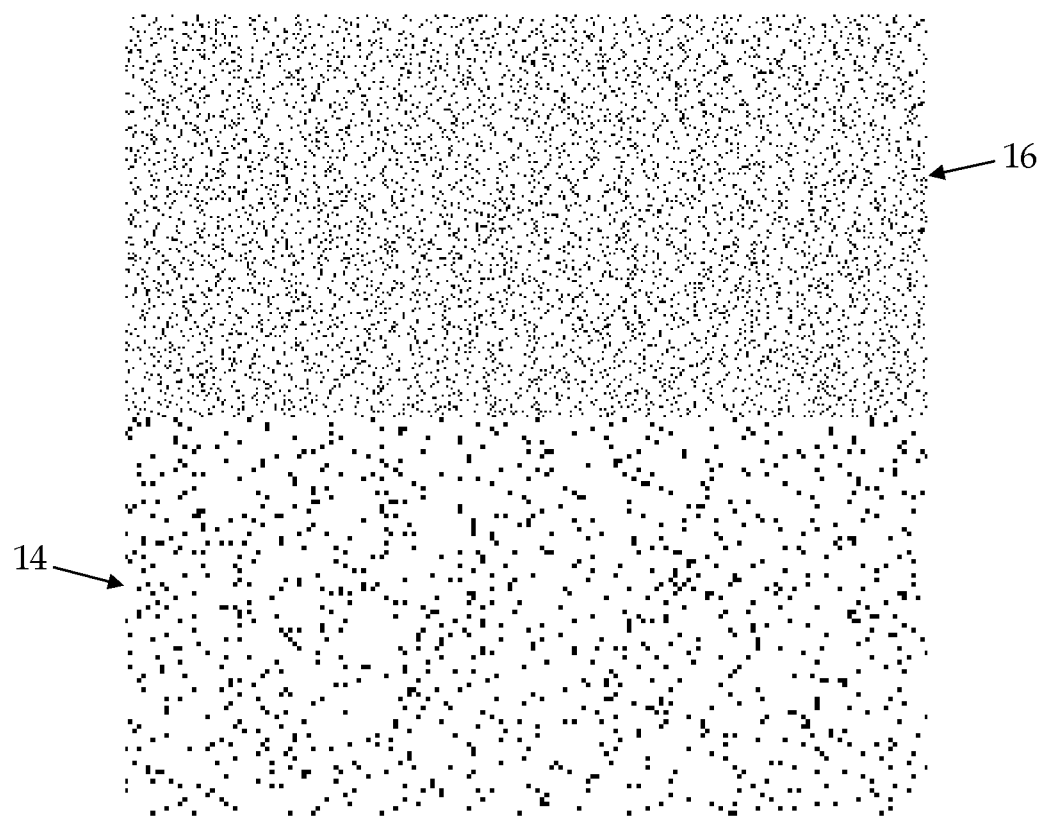
FIG. 6 is an enlarged view schematic representation of a portion of one of the test void pantographs of the test sheet of FIG. 2, where, in this example representation, the void pantograph is also generated with different dot sizes and different black pixel densities.

In a non-limiting example, the test pantographs 12, TP are binary, and are generated using differential dot sizes and differential black pixel concentrations. Three exploded versions of portions of such test pantographs 12, TP are shown in FIGS. 4-6. While these characteristics are used herein for illustrative purposes, it is to be understood that other characteristic constructions may be used. For example, dot shape, dot orientation, dot density, dot color, dot distribution, dot spacing patterns, or combinations thereof may be used to generate the various test pantographs 12, TP of the test sheet 10.

As one example, when a 600 dots per inch (dpi) printer is to be used to print the test pantographs 12, TP 2×2 pixel dots (e.g., making up the foreground 14) and 1×1 pixel dots (e.g., making up the background 16) may be selected for the dot sizes. The percentage of black ink coverage may be varied by changing the density of dot placement. In order to select the desirable static background 16, multiple densities are tested prior to varying the foreground 14 characteristics. For example, the background 16 ink coverage percentage is tested at different values in the range of 5% coverage to 50% coverage of the total background 16 area. Such characteristics may be tested using a test sheet 10 similar to that described above. It is to be understood that any other variances may be used in subsequent (i.e., staggered, refined, or more limited range) test sheets 10 after a broader-range test sheet 10 is used to hone in on smaller, desirable range(s). In one non-limiting example, the 10% coverage for the pantograph background 16 is a suitable concentration. Such coverage increases brightness (i.e., the perceptual blackness diminishes), but the dots do not completely disappear when copied (printed and scanned), thereby affording a drop-out background suitable for testing the foreground 14 patterns. It is believed that other backgrounds 16 may be suitable as well, depending, at least in part, on the desirable characteristics for the deployed void pantograph 12 and the workflow associated therewith.

FIG. 4 illustrates an exploded view of one example of a test pantograph 12, TP in which both the background 16 (including 1×1 pixel dots) and the foreground 14 (including 2×2 pixel dots) are printed at 10% black dot density. In this particular example, a "random" dot placement is used to avoid Moiré patterns, etc.

FIGS. 5 and 6 illustrate exploded views of other examples of test pantographs 12, TP in which different relative concentrations of foreground 14 dots/pixels are used to determine which combination of foreground 14 and background 16 works best with a given printer and scanner (for example, the dot gain after printing on inkjet printers tends to make the dots more similar in size than after printing on laserjet printers, due, at least in part, to ink spread into the paper fibers). In FIG. 5, a 50% higher concentration of black pixels is used for the larger dots (2×2 at 600 dpi) in the pantograph foreground 14 when compared to the smaller dots (1×1 at 600 dpi) in the pantograph background 16. In FIG. 6, the smaller dots have a 50% higher concentration of black pixels than the larger dots.

When generating the test pantographs TP to find the optimum void pantograph 12 characteristic(s) (e.g., densities), any background 16 characteristic may be held constant while one or more foreground 14 characteristics are varied, or vice versa. As one non-limiting example, the background 16 black pixel concentration (e.g., 10% black pixels) may be held constant while the foreground 14 concentration is varied from, for example, 4% to 25% in 1% or less increments (i.e., 40% to 250% as much as the 10% black pixels in the background).

While not discussed herein, it is to be understood that both the pantograph foregrounds 14 and the pantograph backgrounds 16 may be varied to generate the test sheet 10.

The examples shown in FIGS. 2 through 6 illustrate test pantographs 12, TP in which the foreground 14 specifications do not overlap. It is to be understood, however, that two or more foreground 14 patterns may overlap. As a non-limiting example, a 5% black pixel coverage concentration foreground 14 may be distributed in multiple ranges of two pantographs 12 (or over most of the printed region), and as such, a 10% black pixel coverage concentration will be distributed in portions where the two foregrounds 14 overlap. In this example, the background 16 black pixel coverage concentrations may be 0%, 5% or 10%, depending upon the foreground 14 black pixel coverage concentration. In this example, for the entire printed region, the total foreground 14 black pixel coverage concentration at a particular portion plus the background 16 black pixel coverage concentration at that particular portion equals 10%. In some instances, this helps obscure the void pantograph TP, 12 until copied, i.e., this overlap produces the most desirable pantograph foreground 14, which is covert after printing and overt after scanning. The effectiveness of this overlap approach is variable, depending, at least in part, on the printer, scanner, and substrate (e.g., paper) used.

Once generated, the test sheet 10 is printed, as shown at reference numeral 102 of FIG. 1. From the printed test sheet 10, one or more of the test void pantographs 12, TP are identified as having a covert or semi-covert pantograph foreground 14 and background 16 (as shown at reference numeral 104 of FIG. 1). Generally, any pairing in which the foreground 14 is substantially visibly indistinguishable from the background 16 may be identified as a potentially suitable combination for subsequent deployment. The similarities between the foregrounds 14 and backgrounds 16 of the printed test pantographs 12, TP are evaluated or assessed manually (by a human observer) or are scored by an automated (e.g., machine vision) process.

The test sheet 10 is then scanned, as shown at reference numeral 106 of FIG. 1. From the scanned test sheet 10, one or more of the test void pantographs 12, TP are identified as having an overt pantograph foreground 14 (as shown at reference numeral 108 of FIG. 1). Generally, any foreground 14 that is visibly distinguishable from the background 16 may be identified as a potentially suitable candidate for subsequent deployment. The differences between the foregrounds 14 and backgrounds 16 of the printed and scanned test pantographs 12, TP are evaluated or assessed manually (by a human observer) or are scored by an automated (e.g., machine vision) process.

The test void pantographs 12, TP identified after printing are compared with the test void pantographs 12, TP identified after scanning. Any test void pantograph 12, TP identified as having both i) the covert or semi-covert pantograph foreground 14 and background 16 after printing, and ii) the overt pantograph foreground 14 after scanning is suitable for being deployed as the void pantograph 12 in a printed region on an object. It is to be understood that no, one, or multiple test pantograph(s) 12, TP may be identified at this point. Often, the test sheets 10 will include some effective void pantographs 12, some that have foregrounds 14 that are not visible/distinguishable after printing or scanning and/or some that have foregrounds 14 that are visible/distinguishable after printing. The latter examples are not effective void pantographs 12. If none of the test pantographs 12, TP are identified as being suitable for object deployment, another test sheet 10 may be generated in an attempt to create a suitable, deployable void pantograph 12.

Once the test void pantograph(s) 12, TP is/are identified as having both i) the covert or semi-covert pantograph foreground 14 and background 16 after printing, and ii) the overt pantograph foreground 14 after scanning, a workflow may be developed for the selected void pantograph(s) 12, TP, as shown at reference numeral 110. It is to be understood that if the void pantograph images are largely different, an appropriate sample set spanning the set of images can be generated and tested, instead of just one image (as shown in FIG. 2). As used herein, the workflow may be a list of deployment specifications for the selected void pantograph(s) 12, TP, or a workflow may be anything that is initiated via correct reading of the deployed void pantograph 12. In one embodiment, the workflow is based upon an end-use for the void pantograph 12. Such end-uses may include, for example, forensics, authentication, quality/inspection applications, or any other desirable end use.

In one embodiment, the list of deployment specifications may be generated by determining or identifying which characteristics were used to generate the selected test void pantograph 12, TP. If the characteristics are known to the user generating the workflow (e.g., he/she also generated the test sheet 10), the user may simply compile the characteristics. Examples of such characteristics may include a printer to be used for deployment, a substrate to be used for deployment, a copier or scanner that optimally develops the void pantograph(s) 12, pantograph foreground 14 characteristics and pantograph background characteristics (e.g., dot size, dot shape, dot orientation, dot color, a dot distribution method, a dot spacing pattern, percent black pixels, etc.), a database for storing image features, characteristics (e.g., text, graphics, glyphs, etc.) used to classify the void pantograph(s) 12, characteristics used to link the void pantograph(s) 12 to a particular printer (non-limiting examples of which include the deployment specs for the void pantograph 12, filtering process for the images 18, set of images 18 to be converted into void pantographs 12, etc.), or combinations thereof.

When one or more of the characteristics are not known or when it is desirable to determine the best settings for a new printer, the user may further analyze the selected void pantograph 12, TP to identify the characteristics. It is to be understood that further analysis of the selected void pantograph 12, TP may also be desirable for developing a workflow for forensics purposes (e.g., when it is desirable that the deployed void pantograph 12 provide evidence of a particular printer and/or copier used), or for implementing a calibration workflow (e.g., to ensure the readability of the deployed void pantograph 12).

As shown at reference numeral 112 of FIG. 1, the further analysis includes identifying regions of interest within the void pantograph 12, TP using existing segmentation software. As a result of segmentation, the void pantograph 12, TP is aggregated into usable regions of interest. Segmentation includes thresholding the void pantograph 12, TP, which binarizes it, leaving any ink areas black and any non-ink areas white. Erosion or a thinning process may then be performed on any connected black areas. This process completely erases the small dots of the void pantograph 12, TP and shrinks, but does not erase, the large dots. Generally, 1-pixel boundary erosion will be sufficient for performing this step, but may vary, depending, at least in part, on the dot sizes (i.e., shapes, orientations, concentrations/percentage-black-coverage, etc.) used in the void pantograph 12, TP. In some instances, one or more of the smaller dots may not be erased completely, but they will generally not interfere with identifying regions of interest.

After erosion or thinning, the void pantograph 12, TP is subjected to dilation or fattening. This process returns the larger dots to their original size, but does not reconstitute the small dots that have been erased. Erosion and dilation may be accomplished in each of the x and y direction. For example, erosion of several dot configurations by 1 in each direction may be followed by dilation of the dot configurations by 1 in each direction. It is to be understood that the 2×2 or larger dots remain after the two simple erosions, and regain their original size after the dilation operations.

One or more regions of interest may then be identified or formed with the remaining dots. In one embodiment, run length smearing (e.g., using the square root of the inverse of the black percentage of pixels) is used to cluster the dots left over into their original associated shape(s) or form(s). These shape(s) or form(s) are the region(s) of interest that may be subjected to one or more forms of analysis. In another embodiment, run length smearing is not performed, and the regions of interest are made up of the dilated dots. When run length smearing is not performed, texture analysis may be used to identify the foreground 14 versus the background 16 in the dilated dots, and thus to identify the regions of interest. In another embodiment when run length smearing is not performed, simple dilation/density maps may be used to identify the regions of interest after erosion and dilation.

The region(s) of interest may be analyzed via human evaluation, machine evaluation, or both, as shown at reference numeral 114. Human evaluation generally involves a visual perception of how the region(s) of interest look when compared to the original image (e.g., image 18, shown in FIG. 3A). In one embodiment, the person doing the evaluation has access to the original image 18, which may, for example, be stored in a secure registry. In another embodiment, the original image 18 may be overtly printed elsewhere on the test sheet 10, and thus the visual perception may be made without having to access a secure registry. Generally, one may visually analyze whether the region(s) of interest of the scanned test void pantograph 12, TP look like corresponding regions in the original image 18. Human evaluation may be used to determine whether the workflow should specify that portions of the original image 18 should be removed from the void pantograph 12, TP in order to create an overt-to-copy protection bridge, and/or to specify whether the void pantograph 12, TP should be variable (i.e., selecting a portion of the void pantograph 12, TP to be variable from one image and/or object to the next).

As mentioned hereinabove, machine evaluation may also be used to analyze the region(s) of interest of the test void pantograph 12, TP. In one example, machine evaluation may be used to automatically assess the pixels within the foreground and background regions 14, 16 before and after copying and to verify that one or more of the selected test void pantographs 12, TP has the largest difference in "pantograph grading", such as dot mean size, distribution or linear combination of the two in comparing foreground 14 and background 16, etc.

It is to be understood that any type of pattern recognition process that is suitable for analyzing a pattern embedded in the void pantograph 12, TP (e.g., such pattern being present as a result of the image 18 used) may be used. Machine analysis may be particularly useful when the test void pantograph 12, TP contains specific text, shapes, or glyphs (and when the workflow involves testing the readability of the selected void pantograph 12, TP), and/or when it is desirable that the workflow provides evidence of the printer and/or copier used. As one example, if specific text is included in the original image 18, then optical character recognition (OCR) may be performed on the test void pantograph 12, TP region(s) of interest in order to interpret such text. As another example, if a specific shape is included in the original image 18, then shape analysis (such as, for example, Freeman, chain, coding, etc.) may be performed on the test void pantograph 12, TP region(s) of interest in order to interpret such shapes. Shape analysis may be particularly useful in instances where logos or other graphics are used to form the void pantograph 12, TP. Shape analysis may also be desirable to render the void pantograph 12, TP more difficult to reverse engineer.

Either human evaluation or machine evaluation may be used to compare the original image 18 (when a user has access to such image 18) to the scanned test void pantograph 12, TP. The results of this analysis may be useful for developing a desirable workflow.

In one example, the pattern recognition analysis identifies, with statistical significance, a printer that is used to print the test void pantograph 12, TP. If the pattern recognition process is successful, the results of the analysis are indicative of specs of the printer used to print the test sheet. For example, it may be known that a certain printer will produce an effective void pantograph 12 only for a confined range of foreground 14 and background 16 settings. When a user sees a void pantograph 12, amidst a plurality of pantographs 12, TP on a copied sheet, having the settings indicative of a particular type of printer, then it may be concluded that this type of printer was used. Importantly, this will eliminate many other printer types.

In another example, the pattern recognition analysis may also indicate characteristics of the selected test void pantographs 12, TP. For example, the results may indicate that one of the selected test void pantographs 12, TP on the sheet 10 has a background 16 percent black pixel coverage of 10% and a foreground 14 percent black pixel coverage of either 6.67%, 8.33%, or 10%, while another of the selected test void pantographs 12, TP on the sheet 10 has a background 16 percent black pixel coverage of 10% and a foreground 14 percent black pixel coverage of either 11.67%, 13.33% and 15%. The midpoint of each foreground 14 may be selected as the percentage that was likely used to generate the respective foregrounds 14. These foreground 14 and background 16 pairings may then be compared with similar data previously stored, for example, in a secure registry. The pairings may be graded using an appropriate set of quality metrics based on the previously stored data. For example, the 8.33% foreground 14 over the 10% background after printing and scanning may match or resemble 70% of a previously stored printed and scanned void pantograph that was printed using an inkjet printer. Similarly, the 13.33% foreground 14 over the 10% background after printing and scanning may match or resemble 98% of a previously stored void pantograph that was printed using an inkjet printer. As such, one can conclude with more certainty that this test void pantograph 12, TP was printed with an inkjet printer. Perhaps more importantly, one can conclude that the other test void pantograph 12, TP (at 70%) was not printed with an inkjet printer. Similar comparisons may be made to identify a copier used to scan the test void pantograph 12, TP.

The types of analysis used in the previous examples may be particularly suitable when it is desirable to include evidence of the printer or copier into the deployed void pantograph 12. For example, the deployed void pantograph 12 may be meant to occur only for a certain printer/copier combination, and when the foreground 14 does not appear after printing and scanning, it is known that either the wrong printer or copier (e.g., MFP) was used. This enables one to verify that the proper equipment is used downstream.

Furthermore, it is to be understood that identifying the printer and/or copier may also be used downstream when analyzing the deployed void pantograph 12. This may be particularly suitable to determine the print technology used, which may also lead to the identification of the printer or copier manufacturer, and, in some instances, the model/SKU of the printer itself. Given the caveats above, however, since multiple printers, and printer and copier combinations may have similar effective void pantograph 12 specifications, it may, in some instances, be possible to narrow down the printer and copier used, but not possible to identify the manufacturer and/or the model/SKU.

In still another example, the pattern recognition analysis may be used when potential security glyphs are created with different test void pantograph 12, TP specifications VP. The analysis may assist in verifying which the of potential security glyphs is easiest to read. This may be particularly desirable when the workflow is to be embedded in the void pantograph 12. Example glyphs that can be included and readily translated (with varying security payload densities, depending on the particular void pantograph instantiation, printer, scanner, and substrate) are 1D, 2D and 3D (multi-gray level) bar codes, modulation transfer function (MTF) targets, graphical alphanumerics (code sets where different glyphs represent different alphanumeric characters), and curvature-based glyphs (e.g., guilloches).

Once the test void pantographs 12, TP suitable for deployment are selected and any analysis thereof is complete, the desirable workflow is generated (again, as shown at reference numeral 110). In some instances, the workflow may be based, at least in part, on the analysis of the test pantographs 12, TP.

As briefly mentioned above, in one embodiment, the workflow may involve calibration of the selected test void pantograph 12, TP. In such instances, the segmentation and analysis steps previously described are performed. These steps are accomplished in order to ensure that the void pantograph 12 is printed with the correct printer, and can be read correctly after being printed and scanned. Generally, multiple test void pantograph 12, TP configurations will be simultaneously printed and then scanned, and the one most readable in the workflow in which it is intended to be used in is selected as the deployment candidate.

In another embodiment, the workflow may be the previously described list of deployment specifications. This workflow may be sent to a printer such that the correct void pantograph 12 is generated and deployed on the object. The specifications may be saved in a secure registry for comparison downstream with scanned and read void pantographs 12, for example, to authenticate an object associated therewith.

In still another embodiment, the workflow is anything that is initiated via correct reading of the deployed void pantograph 12. For example, the workflow may include message(s) and/or instructions embedded/encoded in the void pantograph 12 that are revealed after scanning or after correct reading of the pantograph 12. It is to be understood that when direct human verification or interpretation is desirable, the void pantograph 12 itself is the message. In other instances, the void pantograph 12 itself is not the message, but rather the pattern of the void pantograph 12 is a token, or look-up, to the registry of images held elsewhere. When the deployed void pantograph 12 is analyzed (which is discussed further hereinbelow), the points or regions of interest are determined, and the best match to the points/regions of interest previously identified and stored in the backend/secure registry tells what the void pantograph 12 represents (e.g., token, nonce, look-up, job entry point, workflow key, or the like), and so the associated workflow is instantiated.

Such workflows may include, for example, instructions or messages for notifying the proper authorities that someone is forging a document, shutting down the copier, sending an email with the image of the copied document to a backend server, reading settings or determining the source of the print (as described hereinabove) and/or optimizing settings for the copy thereof, indexing, archiving, acting upon the index data by moving information around, affecting accounts, balances, approving procedures, progressing claims, etc.

It is to be understood that in some instances, the workflow may be automated (e.g., enabled by the copier used). Generally, if the void pantograph 12 is correctly read by a human, the human manually initiates the workflow, and if the void pantograph 12 is correctly read via software, then upon decoding the void pantograph 12, the next appropriate software task is initiated.

After the test void pantograph(s) 12, TP is/are selected and the workflow therefore is generated, the method further includes generating the void pantograph 12, and deploying the void pantograph 12 in a printed region on an object, as shown at reference numeral 116 of FIG. 1.

At least a portion of the (e.g., image 18 shown in FIG. 3A) is converted into the void pantograph 12 using desirable/previously selected deployment characteristics. Converting the image 18 into the void pantograph 12 is accomplished by scanning and transforming the image 18. Transforming the image 18 includes assigning the appropriate pixels of the image 18 to the pantograph foreground 14 and the pantograph background 16, as determined via the previously described filtering process.

When converting the image 18 into the void pantograph 12 the image 18 is filtered into foreground (e.g., generally high-interest (e.g., high-frequency, high-entropy, high edginess) containing areas) and background areas. The so-marked foreground areas are replaced (overwritten) with the distributed foreground 14 pantograph dots and the background areas are overwritten with the distributed background 16 pantograph dots.

The generated void pantograph 12 is printed on an object (not shown) as the background of the object. It is to be understood that the term "object" as used herein is to be interpreted broadly and may include, but is not limited to, any type of object, product, document or package. Likewise, the term "package" is to be interpreted broadly herein to include any unit for containing a product, displaying a product, or otherwise identifying a branded good. Non-limitative examples of such packages include boxes, bags, labels, containers, clamshells, bands, tape, wraps, ties, bottles, vials, dispensers, inserts, other documents, or the like, or combinations thereof.

It is to be understood that any normal information printed on the object (e.g., text, pictures, logos, graphics, tables, or the like) is the main payload of the object, and thus makes up the foreground of the object. In an embodiment, the void pantograph 12 printed on the object looks like dots printed in the background (see, e.g., FIG. 3B). The normal information is generally printed on the object such that it does not undesirably obstruct the void pantograph foreground 14 from being read after scanning has occurred. In one embodiment, the normal information is not printed over the void pantograph 12 at all. In another embodiment, the normal information is printed over the void pantograph 12 in a manner such that, after scanning, all or a portion of the void pantograph foreground 14 is distinguishable from both the pantograph background 16 and the object's normal information/foreground.

If the workflow includes embedded/encoded information, such information may be steganographic and embedded/encoded directly in the void pantograph 12. Such information is variable, and thus may be different for each void pantograph 12 in a series (e.g., mass serialized). In some embodiments, the information is authenticating information, security information, instructions, messages, or combinations thereof. As a non-limiting example, watermarks, copy detection patterns, and line/halftoning/Moiré patterns may be scaled and represented in the void pantograph 12. The information-containing pattern(s) is/are embedded in the void pantograph 12 during its creation. In some instances, the information or a token for the information is incorporated into the image 18 that is used to form the void pantograph 12.

As an alternative to, or in addition to, encoding the information into the void pantograph 12, another steganographic approach may be utilized with the void pantographs 12 disclosed herein. In this non-limiting example, part (as opposed to all) of the original image 18 may be used during the void pantograph 12 creation. In this embodiment, the part of the image 18 that is not included in the void pantograph 12 may be used to enable the workflow, hidden in plain sight on the void pantograph 12. For example, the portion of the image 18 not utilized in the void pantograph 12 may be stored in a secure registry, and may be linked to both the void pantograph 12 and the object in the registry. When the portion of the image 18 is extracted from the void pantograph 12 (discussed further hereinbelow), the part of the image 18 may be used by someone with access to the original image 18 (in the secure registry) to authenticate the object and enable any workflow associated therewith.

Intentional changes may also be made to the void pantograph 12 consistent with mass serialization, data hiding, or other security related tasks (e.g., the pantograph 12 may be linked to other features printed overtly (i.e., repeating a variable printed area).

After being deployed, the printed region of the object may be scanned at any time, as shown at reference numeral 118. Scanning causes the foreground 14 of the void pantograph 12 to exhibit properties which are visibly distinguishable from the background 16 and the information printed in the object foreground. A non-limiting example of the void pantograph 12 after scanning is shown in FIG. 3C.

Any workflow that is directly tied to the deployed void pantograph 12 (i.e., the workflow does not involve calibration or generation of deployment specifications) may be initiated after the void pantograph 12 is correctly read. Correct reading (see reference numeral 120 of FIG. 1) may be accomplished after the foreground 14 is revealed (e.g., if the void pantograph 12 itself is the message), or after the features of the void pantograph 12 are readily identified with existing segmentation software, and are analyzed. To reiterate from above, segmentation may be used to identify the regions of interest of the deployed void pantograph 12, and such region(s) of interest may be analyzed (e.g., human evaluation, machine evaluation, or both).

As a non-limiting example, the deployed void pantograph 12 may be segmented, and glyph analysis may be used to analyze the regions of interest. As previously mentioned, glyphs include security-specific marks and patterns, for example, 1D and 2D bar codes, and may be used, for example, as a token or nonce for a workflow associated with the void pantograph 12. Barcodes are commonly read to instantiate further software system tasks. The void pantograph 12 disclosed herein is such that it can be logically read as a barcode or other data-containing marker. Glyphs may be included in the void pantograph foreground 14, and thus will emerge in response to scanning. The glyphs will be segmented into regions of interest that can be directly analyzed using appropriate security printing and imaging, inspection, authentication and/or forensic algorithm(s). Once correctly read, the workflow is revealed and may be implemented.

While several embodiments have been described in detail, it will be apparent to those skilled in the art that the disclosed embodiments may be modified. Therefore, the foregoing description is to be considered exemplary rather than limiting.

What is claimed is:

1. A method for using void pantographs, the method comprising:
    generating a test sheet including multiple void pantographs, each of the multiple void pantographs including a pantograph foreground and a pantograph background;
    printing the test sheet;
    identifying from the printed test sheet at least one of the multiple void pantographs having a covert or semi-covert pantograph foreground and background;
    scanning the printed test sheet;
    identifying from the scanned test sheet at least one of the multiple void pantographs having an overt pantograph foreground; and
    developing a workflow for the at least one of the multiple void pantographs having both i) the covert or semi-covert pantograph foreground and background after printing, and ii) the overt pantograph foreground after scanning.

2. The method as defined in claim 1 wherein prior to developing the workflow, the method further comprises:
    segmenting the at least one of the multiple void pantographs having both i) the covert or semi-covert pantograph foreground and background after printing, and ii) the overt pantograph foreground after scanning, thereby identifying at least one region of interest for the at least one of the multiple void pantographs; and
    analyzing the at least one region of interest;
    wherein the workflow is based upon the analysis.

3. The method as defined in claim 2 wherein analyzing the at least one region of interest includes:
    performing a pattern recognition process on the at least one region of interest; and
    from the pattern recognition process, identifying with statistical significance a printer used to print the at least one of the multiple void pantographs.

4. The method as defined in claim 2 wherein analyzing the at least one region of interest includes associating image characteristics of the at least one of the multiple void pantographs with previously stored image characteristics of an other void pantograph previously printed with at least one printer.

5. The method as defined in claim 4, further comprising identifying with statistical significance a printer used to print the at least one of the multiple void pantographs from the analysis.

6. The method as defined in claim 2 wherein after printing and scanning the method further comprises:
    identifying a plurality of the multiple void pantographs having both i) the covert or semi-covert pantograph foreground and background after printing, and ii) the overt pantograph foreground after scanning; and
    selecting, for the segmenting step, at least one of the plurality of the multiple void pantographs having a most distinguishable pantograph foreground compared to its corresponding pantograph background after scanning.

7. The method as defined in claim 2 wherein segmenting includes:
    thresholding the at least one of the multiple void pantographs, thereby binarizing the pantograph into black and white areas;
    performing erosion of connected black areas of the pantograph, thereby reducing at least some pixels and eliminating at least some other pixels within the connected black areas of the pantograph;

performing dilation of any remaining pixels for the pantograph; and forming the at least one region of interest with the dilated remaining pixels.

8. The method as defined in claim 1 wherein developing the workflow includes compiling a list of deployment specifications for the at least one of the multiple void pantographs.

9. The method as defined in claim 8 wherein the list of deployment specifications includes at least one of a printer to be used for deployment, a substrate to be used for deployment, a copier or scanner that optimally develops the at least one of the multiple void pantographs, pantograph foreground characteristics, pantograph background characteristics, a database for storing image features, characteristics used to classify the at least one of the multiple void pantographs, characteristics used to link the at least one of the multiple void pantographs to a printer, or combinations thereof.

10. The method as defined in claim 1 wherein developing the workflow includes generating instructions to be encoded in the at least one of the multiple void pantographs prior to subsequent deployment.

11. The method as defined in claim 1, further comprising:

deploying the at least one of the multiple void pantographs a printed region on an object;

scanning the printed region, thereby rendering the pantograph foreground of the deployed void pantograph overt; and correctly reading the deployed void pantograph, thereby initiating the workflow.

12. The method as defined in claim 11 wherein correctly reading the deployed void pantograph is accomplished manually via a human, and wherein the method further comprises initiating the workflow via the human.

13. The method as defined in claim 11 wherein correctly reading the deployed void pantograph is accomplished automatically using software, and wherein the method further comprises:

decoding the deployed void pantograph; and in response to the decoding, initiating a next appropriate software task.

14. The method as defined in claim 11 wherein correctly reading the deployed void pantograph includes:

segmenting the deployed void pantograph, thereby identifying at least one region of interest; and performing a pattern recognition process on the at least one region of interest; and grading the deployed void pantograph using a set of quality metrics.

15. The method as defined in claim 1 wherein prior to generating the test sheet, the method further comprises generating each of the multiple void pantographs using respective images.

* * * * *

UNITED STATES PATENT AND TRADEMARK OFFICE
CERTIFICATE OF CORRECTION

PATENT NO. : 8,743,425 B2
APPLICATION NO. : 13/148810
DATED : June 3, 2014
INVENTOR(S) : Steven J. Simske et al.

It is certified that error appears in the above-identified patent and that said Letters Patent is hereby corrected as shown below:

In the Claims

In column 13, line 25, in Claim 11, delete "a" and insert -- in a --, therefor.

Signed and Sealed this
Sixteenth Day of September, 2014

Michelle K. Lee
*Deputy Director of the United States Patent and Trademark Office*